(12) United States Patent
Dwight (10) Patent No.: US 10,999,417 B2
(45) Date of Patent: May 4, 2021

(54) METHOD AND APPARATUS FOR UNICAST PACKET SHARING (71) Applicant: Greyware Automation Products, Inc., Murphy, TX (US)

(72) Inventor: Jeffry Dwight, Murphy, TX (US)

(73) Assignee: Greyware Automation Products, Inc., Murphy, TX (US)

( * ) Notice: Subject to any disclaimer, the term of this patent is extended or adjusted under 35 U.S.C. 154(b) by 153 days.

(21) Appl. No.: 16/213,158

(22) Filed: Dec. 7, 2018

(65) Prior Publication Data
US 2019/0182364 A1 Jun. 13, 2019

Related U.S. Application Data (60) Provisional application No. 62/597,170, filed on Dec. 11, 2017.

(51) Int. Cl.
*G06F 15/173* (2006.01)
*H04L 29/06* (2006.01)
*H04L 29/12* (2006.01)

(52) U.S. Cl.
CPC ........ *H04L 69/164* (2013.01); *H04L 61/2092* (2013.01); *H04L 65/4069* (2013.01); *H04L 65/4076* (2013.01); *H04L 69/14* (2013.01); *H04L 61/6063* (2013.01)

(58) Field of Classification Search
CPC .. H04L 69/164; H04L 61/2092; H04L 12/283
See application file for complete search history.

(56) References Cited

U.S. PATENT DOCUMENTS

| | | | | |
|---|---|---|---|---|
| 8,442,063 | B1* | 5/2013 | Zhou | H04L 12/1881 370/413 |
| 8,446,896 | B2* | 5/2013 | Bedrosian | H04J 3/0667 370/350 |
| 2008/0040500 | A1* | 2/2008 | Cohen | H04L 12/1836 709/231 |
| 2013/0227172 | A1* | 8/2013 | Zheng | H04J 3/0658 709/248 |

* cited by examiner

*Primary Examiner* — Duyen M Doan
(74) *Attorney, Agent, or Firm* — GTC Law Group PC & Affiliates (57) ABSTRACT A method for unicast packet-sharing includes providing a port configured to receive unicast and multicast messages; determining that at least one process is listening to the port; receiving a unicast message at the port; and broadcasting the unicast message to a listening address, thereby providing the unicast message to a proper one of the at least one process listening to the port. An example method includes utilizing a Berkley Sockets compatible API, and ensuring that all listening processes receive a copy, or selectively receive a copy, of the incoming unicasts.

8 Claims, 3 Drawing Sheets

METHOD AND APPARATUS FOR UNICAST PACKET SHARING

CROSS-REFERENCE TO RELATED APPLICATION

This application claims the benefit of U.S. Provisional Application Ser. No. 62/597,170, filed 11 Dec. 2017, and entitled "METHOD AND APPARATUS FOR UNICAST PACKET SHARING" (GREY-0001-P01), which is hereby incorporated by reference in its entirety.

BACKGROUND

The present disclosure is related to network communications, and more specifically but not exclusively to network communications including multiple unicast or multicast listeners on the same computer.

Multiple processes on a computer may bind a UDP listener socket to a given port and IP, and then join multicast groups of interest. Incoming multicasts from the joined groups are delivered to each listener, provided each process explicitly bound the socket non-exclusively, allowing multiple processes to share the same multicast stream of data.

Incoming unicast packets addressed to the bound port will be delivered to only one of the listeners. If one of the processes sends a unicast request, the reply will be delivered randomly to one of the listening processes. This behavior is by design, dating to the introduction of the Berkley Sockets API in 1983, et. sequelae through all current operating systems. Previously known systems, including the industry-standard solution, use separate sockets for unicast and multicast reception, requiring multiple ports.

Various high-level protocols, such as IEEE1588-2008 (Precision Time Protocol, version 2), use a mixture of unicast and multicast on the same port. Accordingly, in previously known systems, these types of protocols are limited to a single listening process on any one computer.

SUMMARY

An example apparatus and/or method allows incoming unicasts to be shared among any number of unicast/multicast listeners using the same port/IP on a single computer.

An example apparatus and/or method allows incoming unicasts to be shared among any number of unicast/multicast listeners using the same port/IP on a single computer.

An example apparatus and/or method is transparent to the operation of the protocol(s) using mixed multicast and unicast; each process will be able to send unicast requests or receive unicast replies even when other processes are bound to the same port/IP.

An example apparatus and/or method uses shared memory and sockets for inter-process communication ("IPC"); further examples may utilize any IPC mechanism.

An example apparatus and/or method improves operations of systems using the IEEE 1588-2008 (Precision Time Protocol, version 2, aka "PTP"), although it is applicable to any other protocol allowing a mixture of unicast/multicast listeners on a same port, and/or any situation where incoming unicasts are shared among multiple processes using the same port (or set of ports) on one computer.

An example system includes a networked computing device operating on a Berkley Sockets Application Programming Interface (API) having a number of communication ports, and further operating a protocol structured to allow multicast and unicast messages to be received at a same one of the number of communication ports, and a number of nodes listening to the same one of the number of communication ports. The example system further includes a controller configured to: determine that at least one process corresponding to one of the number of nodes is listening to the port, receive a unicast message at the port, broadcast the unicast message to a listening address, thereby providing the unicast message to a proper one of the at least one process listening to the port, and where the listening address comprises a dedicated port for shared unicast/multicast messaging.

Certain further aspects of the example system are described following, any one or more of which may be present in certain embodiments. An example system further includes where the networked computing device includes a single computer, and where the number of communication ports comprise a number of user datagram protocol (UDP) ports; where the number of nodes include a corresponding number of processes operating on the networked computing device; and/or where the networked computing device further includes a boundary clock with the number of nodes in communication with one side of the boundary clock, and with one of a grandmaster clock and a best clock in communication with the other side of the boundary clock. An example system further includes each of the number of nodes including at least one of: a computer of a cluster of computers; a uniquely identified process; a uniquely identified process-computer unit operating on a cluster of computers; a uniquely identified process-computer unit operating on a sub-net of a network, the network comprising the sub-net, the boundary clock, and the one of the grandmaster clock and the best clock; and/or a device of an industrial system comprising a number of distributed devices. An example system includes the controller further configured to: provide a shared memory value in response to the at least one process listening to the port, and to configure the shared memory value to indicate that at least one process is listening to the port; provide the shared memory value to indicate how many processes are listening to the port; re-broadcast the unicast message to the listening address in response to determining that a process receiving the unicast message is not the only process listening to the port; provide the shared memory value to indicate which processes are listening to the port; discard the unicast message in response to determining the unicast message is a re-broadcast from the process receiving the unicast message; and/or prevent the re-broadcasting the unicast message to the listening address in response to determining that the process receiving the unicast message is the only process listening to the port.

An example procedure for performing unicast packet sharing includes an operation to provide a port configured to receive unicast and multicast messages, an operation to determine that at least one process is listening to the port, an operation to receive a unicast message at the port, and an operation to broadcast the unicast message to a listening address, thereby providing the unicast message to a proper one of the at least one process listening to the port.

Certain further aspects of an example procedure are described following, any one or more of which may be present in certain embodiments. An example procedure further includes: an operation to determine that at least one process is listening to the port by providing a shared memory value, and configuring the shared memory value to indicate that the at least one process is listening to the port; an operation to configure the shared memory value to indicate how many processes are listening to the port; and/or an operation to configure the shared memory value to indicate which processes are listening to the port. An example procedure further includes performing one or more network utilization enhancement operations, including at least one or more of: discarding the unicast message in response to determining the unicast message is a re-broadcast from the process receiving the unicast message; preventing the re-broadcasting the unicast message to the listening address in response to determining that the process receiving the unicast message is the only process listening to the port; and/or re-broadcasting the unicast message to the listening address in response to determining that a process receiving the unicast message is not the only process listening to the port. An example procedure includes an operation to add a packet wrapper before providing the unicast message to the listening address.

Certain further embodiments of the example procedure are described following, any one or more of which may be present in certain embodiments. An example procedure includes the listening address being a dedicated port for shared unicast/multicast messaging. An example procedure includes an operation to add a packet wrapper before providing the unicast message to the listening address, where the packet wrapper includes an information value such as: a source address for the unicast message; a destination address for the unicast message; a process identifier (PID) for a process performing the broadcasting of the unicast message to the listening address; a process uniquifier for a process performing the broadcasting of the unicast message to the listening address; a time that a packet comprising the unicast message was received; and/or an interface at which the unicast message was received. Example and non-limiting listening addresses include: an IP address of 127.0.0.0/8, an IP address of 127.255.255.255, and/or an IP address (e.g., an IPv6 address) of "::1/128".

Figure 1:
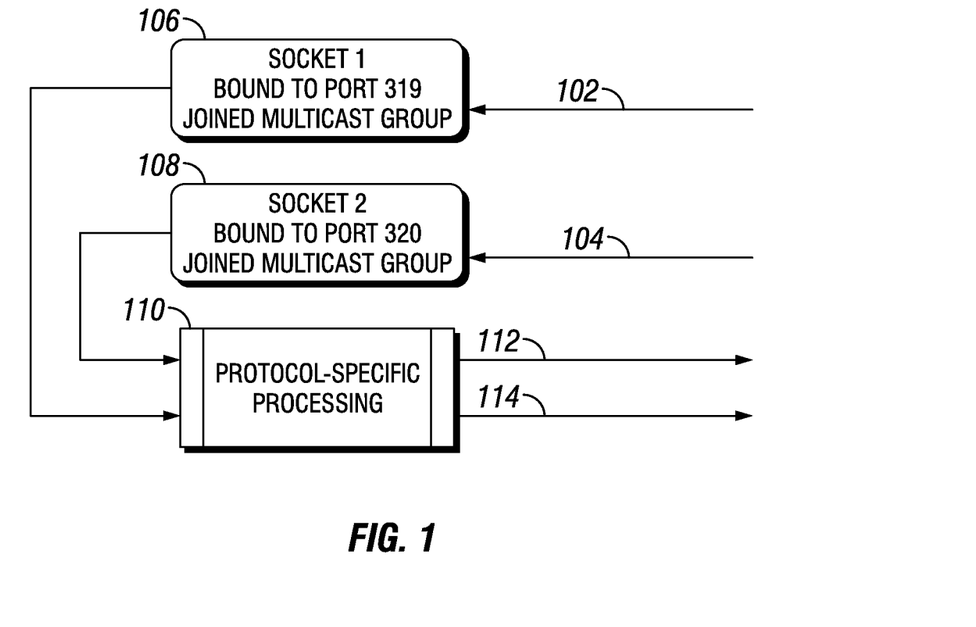
FIG. 1 schematically depicts an example single process, mixed unicast/multicast protocol.
Figure 2:
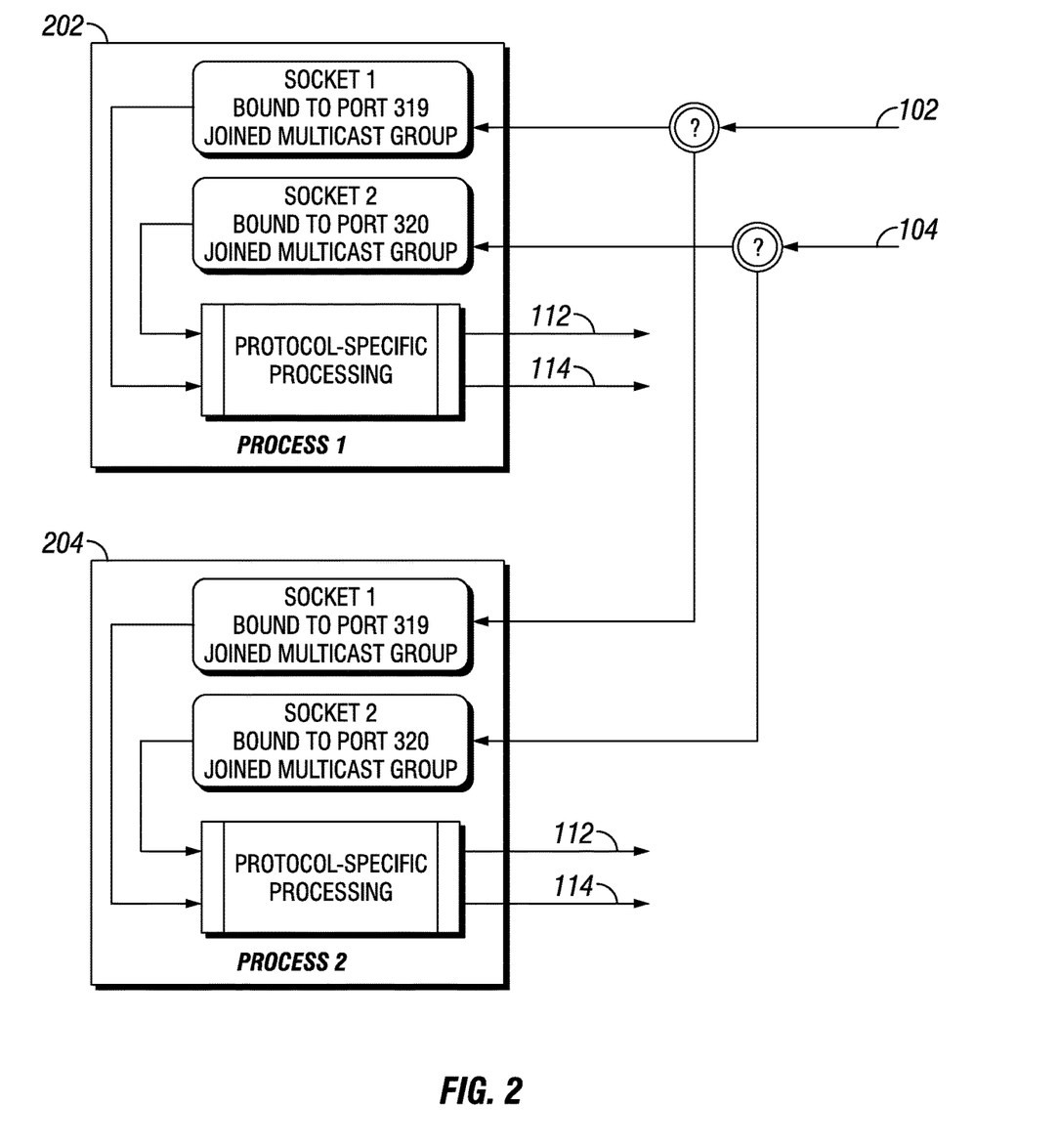
FIG. 2 schematically depicts an example multiple process, mixed unicast/multicast protocol.
Figure 3:
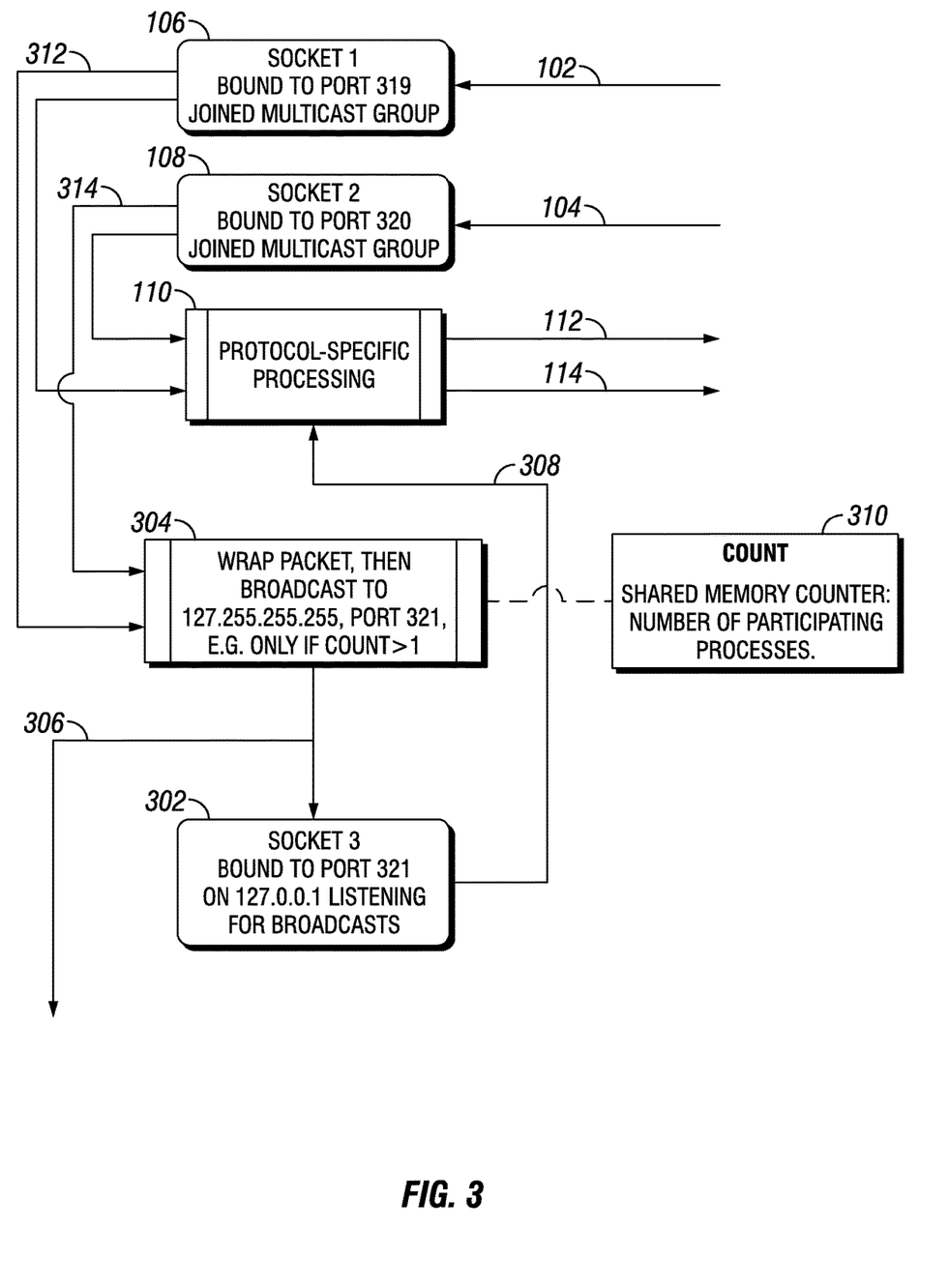
FIG. 3 schematically depicts a unicast packet-sharing apparatus consistent with certain embodiments of the present disclosure.

An example system includes a networked computing device operating on a Berkley Sockets Application Programming Interface (API) having a number of communication ports, and further operating a protocol structured to allow multicast and unicast messages to be received at a same one of the number of communication ports, a number of nodes listening to the same one of the number of communication ports, and a means for providing a unicast message received at the same one of the number of communications ports to a target one of the number of nodes. Without limitation to any other aspect of the present disclosure, certain aspects of the present disclosure that provide a unicast message received at the same one of the number of communications ports to a target one of the number of nodes include: a process as depicted in FIG. 1 and/or described in relation to FIG. 1; a process as depicted in FIG. 2 and/or described in relation to FIG. 2; an apparatus as depicted in FIG. 3 and/or described in relation to FIG. 3; any controller, computer, logic circuit, hardware arrangements, processors, memory, input/output devices, and/or network devices configured to perform one or more operations described in relation to FIG. 1, FIG. 2, and/or FIG. 3; any controller, computer, logic circuit, hardware arrangements, processors, memory, input/output devices, and/or network devices configured to embody one or more aspects of an apparatus depicted or described in relation to FIG. 1, FIG. 2, and/or FIG. 3; and/or any variations of such processes, systems, or apparatuses as described throughout the present disclosure.

Certain further aspects of an example system are described following, any one or more of which may be present in certain embodiments. An example system includes the networked computing device including a single computer, and where the number of communication ports include a number of user datagram protocol (UDP) ports; where the number of nodes include a corresponding number of processes operating on the networked computing device; and/or where the networked computing device includes a boundary clock with the number of nodes in communication with one side of the boundary clock, and with one of a grandmaster clock and a best clock in communication with the other side of the boundary clock.

Certain further aspects of an example system are described following, any one or more of which may be present in certain embodiments. An example system further includes where the protocol includes a precision time protocol (PTP); where the PTP further includes the Institute of Electrical and Electronics Engineers standard 1588 (IEEE-1588); where the PTP further includes IEEE1588-2008; where the networked computing device includes a single computer, and where the ports include a number of user datagram protocol (UDP) ports; where the number of nodes include a corresponding number of processes operating on the networked computing device; and/or where the networked computing device includes a boundary clock with the number of nodes in communication with one side of the boundary clock, and with one of a grandmaster clock and a best clock in communication with the other side of the boundary clock. An example system includes the means for providing a unicast message received at the same one of the plurality of communications ports to a target one of the plurality of nodes at least partially embodied as a controller configured to: determine that at least one process corresponding to one of the plurality of nodes is listening to the port receive a unicast message at the port; broadcast the unicast message to a listening address, thereby providing the unicast message to a proper one of the at least one process listening to the port; and/or where the listening address includes a dedicated port for shared unicast/multicast messaging. An example system includes the means for providing a unicast message received at the same one of the plurality of communications ports to a target one of the plurality of nodes at least partially further embodied as a controller configured to: to provide a shared memory value in response to the at least one process listening to the port, and to configure the shared memory value to indicate that at least one process is listening to the port; provide the shared memory value to indicate how many processes are listening to the port; re-broadcast the unicast message to the listening address in response to determining that a process receiving the unicast message is not the only process listening to the port; discard the unicast message in response to determining the unicast message is a re-broadcast from the process receiving the unicast message; prevent the re-broadcasting the unicast message to the listening address in response to determining that the process receiving the unicast message is the only process listening to the port; provide the shared memory value to indicate which processes are listening to the port; and/or add a packet wrapper before providing the unicast message to the listening address.

Certain further aspects of an example system are described following, any one or more of which may be present in certain embodiments. An example system includes the packet wrapper including an information value such as: a source address for the unicast message; a destination address for the unicast message; a process identifier (PID) for a process performing the broadcasting of the unicast message to the listening address; a process uniquifier for a process performing the broadcasting of the unicast message to the listening address; a time that a packet comprising the unicast message was received; and/or an interface at which the unicast message was received.

DETAILED DESCRIPTION

Referencing FIG. 1, an example PTP client or server program is running on a computer. In certain embodiments, any client or server program allowing a mixture of unicast/multicast listeners on a same port is running on the computer. The example PTP client or server program has bound UDP ports 319 (reference 102 on FIG. 1) and 320 (reference 104 on FIG. 1) non-exclusively, and joined IPv4 multicast groups 224.0.1.129 and 224.0.0.107, for example as required by IEEE 1588-2008. Optionally, the client or server program may have also joined FF05::181 and FF02::6B on a pair of IPv6 socket (not shown). Listing 1 shows pseudo-code for bindings of Socket 1 106 and Socket 2 108.

It will be understood that all specific addressing, port selections, and/or protocol specific behaviors described throughout the present disclosure are non-limiting examples to provide for convenience and clarity of description. In certain embodiments, some of the specific values utilized are valuable for particular systems—for example the broadcast to 127.255.255.255 to the local machine, which for many current operating systems and protocols provides for a convenient lever to broadcast to all nodes (processes) and enforce internal containment of a message. In certain embodiments, the specific values utilized merely implement the logic of operations described herein, and the values selected are of no consequence to the logic of those operations. Examples given may be valuable specific examples for one purpose, and schematic descriptions of logical operations for another purpose. Wherever an IPv4 address is provided, an IPv6 address may additionally or alternatively be utilized. Additionally or alternatively, any other addressing system may be utilized (e.g., a local networking system, a future internet addressing protocol, or the like) without changing the fundamental logic of the unicast/multicast sharing operations of the methods and apparatuses described herein. One of skill in the art, having the benefit of the present disclosure and information ordinarily available contemplating a particular system, will readily understand how to implement multicast/unicast process sharing on a port in accordance with the methods and apparatuses described herein. Certain considerations for implementing a particular multicast/unicast process sharing method or apparatus include, without limitation, the network infrastructure setup for a system, the operating system or systems for computers on the network, the addressing systems and protocols utilized, the trade-offs between hardware capability (e.g., capital costs) and efficient utilization of hardware (e.g., operating costs, network throughput, internal computer bus and communication throughput), etc.

Listing 1. Pseudo-Code Showing Socket Bindings

```
Socket 1 = createsocket(IPv4,UDP)
setsocketoption(non-exclusive)
bind(port 319)
join multicast group 224.0.1.129
join multicast group 224.0.0.107
```

-continued

```
Socket 2 = createsocket(IPv4,UDP)
setsocketoption(non-exclusive)
bind(port 320)
join multicast group 224.0.1.129
join multicast group 224.0.0.107
begin listening for incoming packets
send to multicast group or unicast target as needed
```

In an example, each instance of a PTP client or server program running is called a node, and/or a process operating on the computer. FIG. 1 shows a single node operating on one computer. Socket 1 106 is bound non-exclusively to port 319, and receives both multicasts and unicasts with a target port of 319. Socket 2 108 is bound non-exclusively to port 320, and receives both multicasts and unicasts with a target port of 320. Each socket 106, 108 accepts the incoming packets and sends them for "protocol-specific processing," which represents the PTP protocol engine 110, for example operating as defined by IEEE 1588-2008. The result of protocol-specific processing is the production of outgoing unicasts or multicasts directed toward other nodes, with target ports of 319 (e.g., reference 112 on FIG. 1) or 320 (e.g., reference 114 on FIG. 1). Since FIG. 1 shows only one node operating on the computer, the node will operate correctly regardless of whether the incoming packets are unicast or multicast. For example, an incoming multicast on port 319 will be sent to the single process bound to port 319, and an incoming unicast on port 319 will be sent to the single process bound to port 319, both resulting in intended and expected behavior that the message will be transmitted to the process bound to port 319.

The description in the context of FIG. 1 illustrates how there is no conflict if only one node on a computer has bound the listening ports 102, 104. Both multicasts and unicasts directed to those ports 102, 104 will be delivered to the single process.

Referencing FIG. 2, two nodes are depicted operating on the same computer, labeled Process 1 202 and Process 2 204. Each node has a Socket 1 and a Socket 2, each bound to the same ports as shown in the example of FIG. 1. Incoming multicasts on ports 102, 104 will be delivered to both Process 1 202 and Process 2 204, which is likely to result in intended and expected behavior. Incoming unicasts, however, will be delivered only to a single listening socket in a process that is not defined (e.g., either one of Process 1 202 or Process 2 204). For example, a system compatible with the Berkley Sockets API, which includes all current operating systems, require an incoming unicast to be delivered to not more than one of the listening sockets. Whichever default behavior for choosing which socket receives the unicast, in unexpected behavior for the system will result, and a failure to control which socket receives the unicast. An incoming unicast packet will be delivered to either Process 1 or to Process 2, with no way to predict or control which (from the perspective of the unicast message sender, Process 1 202, or Process 2 204). Accordingly, at least in some instances, Process 1 202 may send a request while Process 2 204 receives the reply, or vice versa.

The example of FIG. 2 demonstrates an example where more than one node 202, 204 on the same computer has bound the listening ports 102, 104. Multicast messaging continues to work as expected, but unicast messaging no longer works on previously known systems and protocols. Unicast messages are delivered to the computer, but to only one of the nodes, and the node receiving the unicast message may be non-determinant and/or have variable outcomes at different times.

Referencing FIG. 3, a schematic diagram of an apparatus 300 (e.g., a unicast packet-sharing configured node) to enable operational unicast packet-sharing is depicted. Each node wanting to participate in unicast packet-sharing binds non-exclusively to an additional socket, labeled Socket 3 302 in the example of FIG. 3. The example embodiment has Socket 3 302 bound non-exclusively to 127.0.01, port 321, as shown in Listing 2. Unicast packet-sharing, as utilized herein, references any of the methods, processes, apparatuses, and/or features throughout the present disclosure that provide for multiple listeners at a single port that potentially receives both unicast and multicast messages.

In the example of FIG. 3, the node represented may be any of the nodes in a computer, and in the example further encompasses all processes within the node. One, but only one, of the listening processes within the node will receive the incoming unicast (in the example, via Socket 3 302, using communication 308). The receiving process for the incoming unicast will broadcast the unicast to other processes within the node, for example when other processes are listening, and/or if the receiving process is not the only process listening. An example includes a shared memory counter 310 ("Count") having a value greater than "1", which indicates that more than one process is listening. Each process is listening for the internal broadcasts, and therefore no matter which process receives the incoming unicast packet, all participating processes receive a copy.

Listing 2. Pseudo-Code Showing Unicast Packet-Sharing Bindings

---

Socket 3 = createsocket(IPv4,UDP)
setsocketoption(non-exclusive)
setsocketoption(allow-broadcast)
bind(port 321)
begin listening for incoming packets

---

Upon receipt of a multicast on port 319 (e.g., at Socket 1 106) or port 320 (e.g., at Socket 2 108) the node receiving the packet sends it for protocol-specific processing 110 (e.g., PTP). Incoming multicasts will be delivered to all processes bound to the sockets 106, 108 for the multicast message, resulting in intended and expected behavior. No further action is required, since all relevant nodes on the same computer will receive the multicast.

Upon receipt of a unicast packet on port 319 or port 320, the node receiving the unicast sends it for protocol-specific processing as if it had arrived by multicast. In addition, the node receiving the unicast also encapsulates the packet (e.g., passing the unicast message as a communication 312, 314 to packet wrapping circuit 304), and immediately provides (e.g., as a re-broadcast) the encapsulated packet to IPv4 127.255.255.255 (and/or the respective IPv6 address), port 321 (e.g., as communication 306, received at each processes' respective "Socket 3"). An example encapsulation includes a small wrapper that indicates the source and destination addresses, the process's unique Process Identifier ("PID") assigned by the operating system (or any other uniquifier), and any other useful information according to the system and protocols in use, such as the time the packet was received and/or on which interface. Listing 3 shows an example wrapper structure. The internal broadcast will place a duplicate of the packet in the receive queue of each node participating in unicast packet-sharing, because each node has a Socket 3 listening on 127.0.0.1, port 321.

Note that the choice of port 321 is a non-limiting example. In embodiments, the only requirement is that all participating nodes use the same port number for a given instance of unicast packet-sharing, and that the chosen port not be used for other purposes. The port number could be established by the first process to open the shared memory segment 310, and set as an additional parameter within the shared memory segment 310, thus telling each subsequent process which port to use for the unicast packet-sharing instance. In certain embodiments, the port number can be changed in real time—for example if a high priority process binds to the port number selected—which can be populated to the listening ports and the unicast packet-sharing can be migrated to the new port number. Reference Listing 6 for example pseudo-code wherein a first node participating in the unicast packet-sharing sets the listening port.

The 127.0.0.0/8 range is restricted by Internet Engineering Task Force (IETF) in RFC1700 (Request For Comments series—"Assigned Numbers") for internal use within a single computer. This restriction is enforced by the operating system. Broadcasting (or re-broadcasting) to the 127.0.0.0/8 broadcast address of 127.255.255.255 ensures that while the packet will be received by each node participating in Unicast Packet-Sharing within the same computer, the packet will not be placed on the wire for delivery outside the computer. It will be understood that any other mechanism to enforce packet sharing within the computer (or selected scope where other computers may be involved—such as a computer cluster, distributed devices, and/or a sub-net) may be utilized, including networking systems and/or computer operating systems that do not follow IETF RFC1700, any updates to the Assigned Numbers that subsequently occur by IETF, etc.

Listing 3: Example Broadcast Wrapper Structure

---

```
struct {
    SOCKET_ADDRESS    sourceAddressAndPort;
    SOCKET_ADDRESS    targetAddressAndPort;
    unsigned integer  receivingInterface;
    unsigned integer  receivingPID;
    TIMESTAMP         timeStampIn;
    unsigned integer  cbPacketLength;
    original packet data of cbPacketLength;
} BROADCAST_PACKET_WRAPPER;
```

---

Upon receipt of a broadcast packet from 127.0.0.1, port 321 (Socket 3), the receiving node first examines the PID in the wrapper. If the PID indicates the packet originated from the receiving node itself, the packet is discarded. Otherwise, the wrapper is removed, and the packet is sent for protocol-specific processing (e.g., as communication 308 to protocol-specific processing 310) as if it had been originally received on port 319 or port 320. The wrapper contains all of the information that would normally be available had the packet actually arrived on port 319 or port 320. Listing 4 shows pseudo-code for handling incoming unicasts and multicasts among participating nodes using unicast packet-sharing.

Listing 4: Pseudo-Code for Unicast Packet-Sharing

---

```
// Each node within a single computer participates in
// Unicast Packet-Sharing.
while (incoming packet on port 319 or 320)
{
    feed packet into protocol-specific processing
    if (packet was unicast)
    {
        if (NeedToForward) // see listing 5
```

```
            {
                encapsulate packet with wrapper
                    broadcast to 127.255.255.255 port 321
            }
        }
    }
    while (incoming packet on port 321)
    {
        if (PID != self AND packet was broadcast)
        {
            extract packet from wrapper, and feed
            packet into protocol-specific processing
                as if it had been originally received on
                port 319 or port 320 (the needed
                information is in the wrapper)
        }
    }
```

Referencing FIG. 3, a shared memory counter 310, labeled Count, is depicted. An example Count 310 shared memory counter may include an unsigned 32-bit integer. In an example, the operating system instantiates Count 310 with a value of zero (or any other selected value indicating that no nodes or processes have indicated participation in the unicast packet-sharing). In certain embodiments, the operating system instantiates Count 310 with a value of zero upon a first instantiation, but does not change the value upon subsequent concurrent instantiations. The Count 310 shared memory counter persists as long as one or more nodes/processes are indicating participation in the unicast packet-sharing. When the last participating process closes the Count 310 shared memory counter, the operating system may destroy the Count 310 shared memory counter (e.g., to save memory space, improve system stability, and/or prevent a memory leak). In certain embodiments, the operating system may keep the Count 310 shared memory counter active with the value of zero. A subsequent instantiation by the operating system after the Count 310 shared memory counter is destroyed may be treated as a first instantiation (e.g., instantiating with a zero or no-participant count value).

Each participating node increments Count 310 when it begins listening (participating) on the unicast packet-sharing ports (e.g., 319 and 320), and decrements Count 310 when it stops listening. In one example, Count 310 will therefore be 1 if only one node is listening, 2 if two nodes are listening, and so forth, regardless of the order in which nodes start and stop. While the described example utilizes a Count value of zero (0) to indicate that no nodes are listening, and increments by one (1) for each node listening, it will be understood that any other identifying scheme for listening nodes may be utilized. For example, a non-zero value may be utilized as the baseline—for example to provide for ease of troubleshooting or system de-bugging. In another example, each participating node may increment Count by a value other than one—for example incrementing by some other integer value (e.g., two), incrementing by a process ID value for the node (e.g., 1711 for process ID 1711), incrementing by a bitmasked value (e.g., a first process assigned to 1 increments by 00000001, a second process assigned to 2 increments by 00000010, a third process assigned to 4 increments by 00000100, etc.), incrementing by a number of unicast packet-sharing ports for which the process is participating in (e.g., two for a process listening on both 319 and 320—for example to create utilization statistics or the like). Multiple schemes allow for an operating system or packet sharing management process to determine which and/or how many processes are participating on unicast packet-sharing ports, and/or for a process to determine when it is the only process participating on a unicast packet-sharing port. The Count instantiation and increment/decrement scheme to be utilized for a particular system can readily be determined by one of skill in the art, having the benefit of the disclosure herein and information ordinarily available for a particular system. Certain considerations for determining the Count 310 instantiation and increment/decrement scheme include, without limitation, administrative processing overhead to be utilized to implement a unicast packet-sharing port, the desired resolution of process participant determination (e.g., determining that any process is participating, determining than more than one process is participating, identifying the specific processes participating, allowing for additional capability for a participating process such as a priority request, etc.), and/or the desirability of generating statistical utilization and/or de-bugging information for the unicast packet-sharing port(s).

An example Count 310 is mapped into the process memory of each participating node, and each participating node can, in one example, observe the number of other participating nodes. In an example, if Count 310 is greater than 1, the recipient process knows that a unicast received on port 319 or port 320 may be for another node rather than itself, and broadcasts the packet to 127.255.255.255, port 321, with its wrapper. If Count 310 is exactly 1 (or another value indicating the recipient process is the only participant), only the recipient process is listening, and there is no need to broadcast/re-broadcast the packet. Since the counter 310 is shared by multiple processes, any of which may start or stop at any time, an example apparatus includes memory-barrier techniques. An example unicast packet-sharing process utilizes processor-assisted interlocked functions (for example Intel's lock cmpxchg, which is exposed on Windows as InterlockedCompareExchange). These interlocked functions guarantee atomicity on both reading and writing the variable, so the value is coherent among all processes using it. It will be understood that any other technique to lock the Count 310 value and ensure that only a single process can change it, and can verify that the requested change was implemented, may be utilized.

In certain embodiments, the Count 310 (in any version) may be omitted completely. It will be understood that the utilization of the Count 310 provides for reduced network/bus traffic on the system, reduces processing time for messages to be received, and/or reduces kernel transition times for reading and broadcasting. Accordingly, in certain embodiments, one or more versions of the Count 310 described preceding are included.

Listing 5: Pseudo-Code for Shared Memory Counter Implementation (e.g., Unicast Packet-Sharing Port is Known)

```
open shared memory segment
interlocked increment Count
... run program ...
bool NeedToForward( ) // function
{
    // called by Listing 4 upon receipt of a
    // unicast packet on port 319 or port 320
    return interlocked compare(Count) >1
}
... finish program ...
interlocked decrement Count
close shared memory segment
```

Listing 6: Pseudo-Code for Shared Memory Counter Implementation (e.g., Unicast Packet-Sharing Port is Set by First Participating Node)

```
open shared memory segment
//
// If this is the first process to open the shared
// memory segment, Count will be zero. If a port
// other than the predefined-port number 321 is
// desired, the port number could be set immediately
// after incrementing Count. Subsequent processes
// will see that Count is not zero upon first opening
// the shared memory segment, and use the specified
// port.
//
interlocked increment Count
//
// optional specification of port
//
set Unicast Packet-Sharing port in shared memory
... run program ...
bool NeedToForward( ) // function
{
    // called by Listing 4 upon receipt of a
    // unicast packet on port 319 or port 320
    return interlocked compare(Count) >1
}
... finish program ...
interlocked decrement Count
close shared memory segment
```

The examples described preceding are described in a context specific to PTP, requiring specific UDP ports. However, the Unicast Packet-Sharing process is applicable to any protocol that mixes unicast and multicast among multiple processes on either a single port, or (as with PTP) a set of required ports. The process is also applicable to any protocol that does not use multicast at all, but requires that all listening processes on the same computer bind to the same listening port for unicast reception.

The IPC mechanism described and shown in FIG. 3 is depicted for clarity of description, but any alternate IPC mechanism may be used to accomplish the same purposes. For example, most operating systems support Named Pipes, Mailslots, raw sockets, COM objects, and/or the ability to store more than a single counter in shared memory. Unicast packet-sharing may be accomplished by having an array of received packets in shared memory, or through a subscription process whereby each new process requests all existing processes to forward packets.

Additionally or alternatively, an example unicast packet-sharing operation includes a single process that binds exclusively to the port or ports (or other packet guiding mechanisms) required by the protocol needing to share unicasts. The single process would join the multicast groups required for the protocol (if any), and receive all multicasts and unicasts directed to the machine. The single process would share these packets with individual processes desiring to receive the messages using any convenient IPC mechanism. For example, it could use the technique of local broadcast to 127.255.255.255 as described herein. The single process would select a port that avoids conflict with other protocols. Each process desiring the messages would then only need to listen for broadcasts on 127.0.0.1 with the correct port number. It would not need to join any multicast groups, and it would not need to forward packets to other processes. In a further example, the single process provides a wrapper indicating the original source and target addresses, and the participating process would then have all the same information as if it were the sole mixed unicast/multicast process and were managing the ports and groups directly.

The described examples are provided in the context of a single instance of a unicast packet-sharing operation performed on a computer. Additionally or alternatively, two or more unicast packet-sharing operations may be performed on a computer or other appropriate hardware. For example, a first group of shared unicast ports may be bound to a first Count (e.g., Count1) and a second group of shared unicast ports may be bound to a second Count (e.g., Count2). Any selected operations described herein may be utilized to implement more than one instance of a unicast packet-sharing operation operating on the same computer—for example a wrapper on shared packets may indicate which unicast packet-sharing port group the message belongs to, allowing non-participating packets to ignore them; a single process may bind exclusively to each of the set of ports for a given unicast packet-sharing operation; and/or the single process may provide a wrapper indicating the original source and target address, allowing participating processes to determine whether they are a participant for a given unicast/multicast, and determine if they need to process the message.

In certain embodiments, the unicast packet-sharing operation is provided outside of a single computer. For example, where a boundary clock is positioned between a main network and a cluster of computers operating together, an industrial system including distributed devices (e.g., a number of related sensors, controllers, and/or actuators that are active on a network for an industrial process), and/or a sub-net, the unicast packet-sharing operation enables mixed unicast/multicast operations at a single defining communication location. Example and non-limiting industrial processes, or industrial systems, include manufacturing, distribution, and/or processing (chemical, refining, packaging, sorting, etc.) in any context. In certain embodiments, the "main network" is the network portion including the grandmaster clock (or the current "best" clock). The unicast/multicast packets may be communicable to nodes which may be: individual devices, individual processes (e.g., where a process operates only on a single device, or where a process is shared across device in the cluster), and/or to processes uniquely identifiable by the process-device pair (e.g., process 1768 operating on device 2, where another device in the cluster/sub-net may also have a process 1768). The principles and operations described throughout the present disclosure otherwise apply to computer clusters, distributed devices, and/or sub-nets. In certain embodiments, hardware incorporating the boundary clock (e.g., a router or switch with IEEE 1588 support), and/or one or more of the devices in the cluster, distributed devices, and/or sub-net, may perform the operations of managing the Count including instantiation, implementing memory sharing functions, and/or enforcing memory locking operations.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first operation to interpret, receive, and/or determine a data value may be performed, and when communications are restored an updated operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another.

The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

What is claimed is:

1. A system, comprising:
    a networked computing device operating on a Berkley Sockets Application Programming Interface (API) having a plurality of communication ports, and further operating a protocol structured to allow multicast and unicast messages to be received at a same one of the plurality of communication ports, wherein the networked computing device comprises a single computer;
    a plurality of nodes listening to the same one of the plurality of communication ports, wherein the plurality of nodes comprise a corresponding plurality of processes operating on the networked computing device;
    wherein the networked computing device further comprises a boundary clock with the plurality of nodes in communication with one side of the boundary clock, and with one of a grandmaster clock and a best clock in communication with other side of the boundary clock;
    a processor configured to:
    determine that at least one process corresponding to one of the plurality of nodes is listening to the port;
    receive a unicast message at the port; broadcast the unicast message to a listening address, providing the unicast message to a proper one of the at least one process listening to the port; and
    wherein the listening address comprises a dedicated port for shared unicast/multicast messaging; and
    wherein the plurality of nodes each comprise at least one of; a computer of a cluster of computers;
    a uniquely identified process; a uniquely identified process-computer unit operating on a cluster of computers;
    a uniquely identified process-computer unit operating on a sub-net of a network, the network comprising the sub-net, the boundary clock, and the one of the grandmaster clock and the best clock; and
    a device of an industrial system comprising a plurality of distributed devices;
    wherein the processor is further configured to provide a shared memory value in response to the at least one process listening to the port, and to configure the shared memory value to indicate that at least one process is listening to the port.

2. The system of claim 1, wherein the processor is further configured to provide the shared memory value to indicate how many processes are listening to the port.

3. The system of claim 1, wherein the processor is further configured to re-broadcast the unicast message to the listening address in response to determining that a process receiving the unicast message is not the only process listening to the port.

4. A system, comprising:
- a networked computing device operating on a Berkley Sockets Application Programming Interface (API) having a plurality of communication ports, and further operating a protocol structured to allow multicast and unicast messages to be received at a same one of the plurality of communication ports, wherein the networked computing device comprises a single computer;
- a plurality of nodes listening to the same one of the plurality of communication ports, wherein the plurality of nodes comprise a corresponding plurality of processes operating on the networked computing device;
- wherein the networked computing device further comprises a boundary clock with the plurality of nodes in communication with one side of the boundary clock, and with one of a grandmaster clock and a best clock in communication with other side of the boundary clock;
- a processor configured to:
- determine that at least one process corresponding to one of the plurality of nodes is listening to the port;
- receive a unicast message at the port;
- broadcast the unicast message to a listening address, providing the unicast message to a proper one of the at least one process listening to the port; and
- wherein the listening address comprises a dedicated port for shared unicast/multicast messaging; and
- wherein the plurality of nodes each comprise at least one of: a computer of a cluster of computers;
- a uniquely identified process;
- a uniquely identified process-computer unit operating on a cluster of computers;
- a uniquely identified process-computer unit operating on a sub-net of a network, the network comprising the sub-net, the boundary clock, and the one of the grandmaster clock and the best dock; and
- a device of an industrial system comprising a plurality of distributed devices;
- wherein the processor is further configured to provide a shared memory value in response to the at least one process listening to the port, and to configure the shared memory value to indicate that at least one process is listening to the port; and
- wherein the processor is further configured to provide the shared memory value to indicate which processes are listening to the port.

5. The system of claim 4, wherein the processor is further configured to discard the unicast message in response to determining the unicast message is a re-broadcast from the process receiving the unicast message.

6. The system of claim 4, wherein the processor is further configured to prevent the re-broadcasting the unicast message to the listening address in response to determining that the process receiving the unicast message is the only process listening to the port.

7. A method for performing unicast packet sharing, the method comprising:
- providing a port configured to receive unicast and multicast messages, wherein the determining that at least one process is listening to the port comprises providing a shared memory value, and configuring the shared memory value to indicate that at least one process is listening to the port;
- determining that at least one process is listening to the port;
- further comprising configuring the shared memory value to indicate at least one of how many processes are listening to the port or which processes are listening to the port;
- receiving a unicast message at the port;
- broadcasting the unicast message to a listening address, providing the unicast message to a proper one of the at least one process listening to the port; and
- performing at least one network utilization enhancement operation selected from the operations consisting of:
- discarding the unicast message in response to determining the unicast message is a re-broadcast from the process receiving the unicast message;
- preventing the re-broadcasting the unicast message to the listening address in response to determining that the process receiving the unicast message is the only process listening to the port; and
- re-broadcasting the unicast message to the listening address in response to determining that a process receiving the unicast message is not the only process listening to the port.

8. The method of claim 7, further comprising adding a packet wrapper before broadcasting the unicast message to the listening address.

* * * * *

UNITED STATES PATENT AND TRADEMARK OFFICE
CERTIFICATE OF CORRECTION

| | |
|---|---|
| PATENT NO. | : 10,999,417 B2 |
| APPLICATION NO. | : 16/213158 |
| DATED | : May 4, 2021 |
| INVENTOR(S) | : Jeffry Dwight |

It is certified that error appears in the above-identified patent and that said Letters Patent is hereby corrected as shown below:

In the Claims

In Column 18, Line 51, in Claim 1, delete "of;" and insert -- of: --, therefor.

In Column 18, Line 59, in Claim 1, after "devices;" insert -- and --.

In Column 19, Line 42, in Claim 4, delete "dock;" and insert -- clock; --, therefor.

Signed and Sealed this
Eleventh Day of October, 2022

Katherine Kelly Vidal
*Director of the United States Patent and Trademark Office*